US012795409B2

(12) United States Patent
Pullela et al.

(10) Patent No.: US 12,795,409 B2
(45) Date of Patent: Nov. 10, 2026

(54) METHODS, SYSTEMS, AND COMPUTER READABLE MEDIA FOR PROVIDING A NETWORK TEST ENVIRONMENT WITH MISMATCH MEDIATION FUNCTIONALITY

(71) Applicant: Keysight Technologies, Inc., Santa Rosa, CA (US)

(72) Inventors: Venkateshwar Pullela, San Jose, CA (US); Christian Paul Sommers, Bangor, CA (US); Alexander Bortok, Mountain View, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 323 days.

(21) Appl. No.: 18/392,598

(22) Filed: Dec. 21, 2023

(65) Prior Publication Data

US 2025/0126496 A1 Apr. 17, 2025

Related U.S. Application Data

(60) Provisional application No. 63/544,368, filed on Oct. 16, 2023.

(51) Int. Cl.
*H04W 24/06* (2009.01)
*H04W 24/04* (2009.01)

(52) U.S. Cl.
CPC ........... *H04W 24/06* (2013.01); *H04W 24/04* (2013.01)

(58) Field of Classification Search
None
See application file for complete search history.

(56) References Cited

U.S. PATENT DOCUMENTS 5,751,963 A 5/1998 Umetsu
7,379,857 B2 5/2008 Piesco
7,418,492 B1 8/2008 Cohen et al.
8,290,758 B2 10/2012 Aarts et al.
(Continued)

FOREIGN PATENT DOCUMENTS

WO 2019186367 A1 10/2019
WO 2022208133 A1 10/2022

OTHER PUBLICATIONS

Non-Final Office Action for U.S. Appl. No. 18/385,183 (May 19, 2025).
(Continued)

*Primary Examiner* — Nicholas Sloms

(57) ABSTRACT

Methods, systems, and computer readable media for providing a network test environment with mismatch mediation functionality are disclosed. According to one method, the method occurs at a test system implemented using at least one processor. The method includes configuring a first test bed element (TBE) and a second TBE for performing one or more functions in a test environment, wherein the first TBE and the second TBE have different fidelities and at least one performance or capability mismatch; configuring, using mediation interworking rules and information about the first TBE and the second TBE, a mediation interworking element (MIWE) for mediating the at least one performance or capability mismatch; and performing, during a test session involving the test environment and using the MIWE, at least one mediation action, wherein performing the at least one mediation action.

18 Claims, 5 Drawing Sheets

(56) References Cited

U.S. PATENT DOCUMENTS

| | | | |
|---|---|---|---|
| 8,437,993 B2 | 5/2013 | Aarts et al. | |
| 9,026,422 B2 | 5/2015 | Aarts et al. | |
| 9,294,296 B2 | 3/2016 | Kirschnick et al. | |
| 9,600,386 B1 | 3/2017 | Thai et al. | |
| 10,015,072 B2 | 7/2018 | Cantwell et al. | |
| 10,742,533 B2 | 8/2020 | Yadav et al. | |
| 11,042,675 B2 | 6/2021 | Feng et al. | |
| 11,093,666 B2 | 8/2021 | Minwalla et al. | |
| 11,323,354 B1 | 5/2022 | Sommers | |
| 11,405,302 B1 * | 8/2022 | Liu | H04L 67/10 |
| 11,562,174 B2 | 1/2023 | Traut et al. | |
| 2002/0162059 A1 | 10/2002 | Mcneely et al. | |
| 2003/0191590 A1 | 10/2003 | Narayan et al. | |
| 2010/0097979 A1 * | 4/2010 | Shinozaki | H04L 47/32 370/315 |
| 2010/0198960 A1 * | 8/2010 | Kirschnick | G06F 11/3414 709/224 |
| 2012/0041742 A1 * | 2/2012 | Aarts | G06F 30/33 703/13 |
| 2012/0041750 A1 | 2/2012 | Aarts et al. | |
| 2013/0253899 A1 | 9/2013 | Aarts et al. | |
| 2014/0006570 A1 | 1/2014 | Loos et al. | |
| 2014/0160961 A1 | 6/2014 | Dragulescu et al. | |
| 2014/0321285 A1 | 10/2014 | Chew et al. | |
| 2015/0100622 A1 | 4/2015 | Urban et al. | |
| 2017/0201548 A1 * | 7/2017 | Kinder | H04L 41/0813 |
| 2019/0258753 A1 | 8/2019 | Minwalla et al. | |
| 2020/0021512 A1 | 1/2020 | Naskar et al. | |
| 2020/0313999 A1 | 10/2020 | Lee et al. | |
| 2021/0224183 A1 * | 7/2021 | Péan | H04L 43/028 |
| 2021/0357692 A1 * | 11/2021 | Traut | G06N 3/006 |
| 2022/0237099 A1 * | 7/2022 | Shiraishi | G06F 11/3457 |
| 2022/0365866 A1 | 11/2022 | Mishra et al. | |
| 2024/0172001 A1 * | 5/2024 | Farooq | G06N 3/0464 |
| 2024/0338236 A1 | 10/2024 | Connor, Jr. et al. | |
| 2025/0047586 A1 | 2/2025 | Pullela et al. | |
| 2025/0209375 A1 | 6/2025 | Sommers et al. | |
| 2026/0046235 A1 | 2/2026 | Pullela et al. | |

OTHER PUBLICATIONS

Commonly-Assigned, co-pending U.S. Appl. No. 18/422,953 for "Methods, Systems, and Computer Readable Media for Generating Synthetic Artificial Intelligence (AI)-Implemented Computer Network Behavioral Model Training Data" (Unpublished, filed Jan. 25, 2024).

Commonly-Assigned, co-pending U.S. Appl. No. 18/385,183 for "Methods, Systems, and Computer Readable Media for Providing a Network Test Environment With Variable Emulation Fidelity" (Unpublished, filed Oct. 30, 2023).

Zhou et al., "HyperTester: High-performance Network Testing Driven by Programmable Switches," In The 15th International Conference on emerging Networking Experiments and Technologies (CoNEXT '19), pp. 1-14 (Dec. 9-12, 2019).

Non-Final Office Action for U.S. Appl. No. 17/198,870 (Sep. 17, 2021).

Notice of Allowance and Fee(s) Due for U.S. Appl. No. 17/198,870 (Mar. 24, 2022).

Notice of Allowance for U.S. Appl. No. 18/385,183 (Sep. 16, 2025).

Restriction Requirement for U.S. Appl. No. 18/385,183 (Feb. 20, 2025).

* cited by examiner

400

| RULE ID | MISMATCH / MEDIATION TYPE (E.G., FLOW DIRECTION \| MEDIATION ACTION(S)) | MIWE ID |
|---|---|---|
| RULE 1 | HED->SED \| DOWN-SAMPLING | MIWE 1 |
| RULE 2 | SED->HED \| AMPLIFICATION | MIWE 1 |
| RULE 3 | HED->SUT \| MODIFICATION | MIWE 2 |
| RULE 4 | SUT->HED \| MODIFICATION | MIWE 2 |
| RULE 5 | REAL DEVICE->SUT \| MODIFICATION | MIWE 3 |
| RULE 6 | SUT->REAL DEVICE \| MODIFICATION | MIWE 3 |
| RULE 7 | SED->SUT \| MODIFICATION | MIWE 4 |
| RULE 8 | SUT->SED \| MODIFICATION | MIWE 5 |
| RULE 9 | REAL DEVICE->HED \| DOWN-SAMPLING & MODIFICATION | MIWE 6 |
| RULE 10 | HED->REAL DEVICE \| AMPLIFICATION & MODIFICATION | MIWE 6 |
| RULE 12 | REAL DEVICE->SED \| DOWN-SAMPLING & MODIFICATION | MIWE 7 |
| RULE 13 | SED->REAL DEVICE \| AMPLIFICATION & MODIFICATION | MIWE 8 |

FIG. 4

METHODS, SYSTEMS, AND COMPUTER READABLE MEDIA FOR PROVIDING A NETWORK TEST ENVIRONMENT WITH MISMATCH MEDIATION FUNCTIONALITY

PRIORITY CLAIM

This application claims the priority benefit of U.S. Provisional Patent Application Ser. No. 63/544,368, filed Oct. 16, 2023, the disclosure of which is incorporated herein by reference in its entirety.

TECHNICAL FIELD

The subject matter described herein relates to network testing. More particularly, the subject matter described herein relates to providing a network test environment with mismatch mediation functionality.

BACKGROUND

Network operators may perform testing of a network or nodes therein before or after deployment. When testing network environments, it may be desirable to design a test session or a set of test sessions such that a system under test (SUT) is tested using real-world scenarios and conditions in a realistic environment or infrastructure. With some network test systems, a device or system under test is connected to one or more types of test bed elements (TBEs). However, sometimes a test operator may not know which types of TBEs are needed for achieving a test objective efficiently. As such, testing using different environments or infrastructures can be difficult and/or inefficient with such network test systems due to the time and human resource intensive nature involved in manually configuring test infrastructures. Further, when TBEs have different fidelities or capabilities, various issues can arise that can hinder inter-communications or otherwise make certain TBE combinations impractical for deployment.

SUMMARY

Methods, systems, and computer readable media for providing a network test environment with mismatch mediation functionality are disclosed. According to one method, the method occurs at a test system implemented using at least one processor. The method includes configuring a first test bed element (TBE) and a second TBE for performing one or more functions (e.g., actions, roles, algorithms, etc.) in a test environment, wherein the first TBE and the second TBE have different fidelities and at least one performance or capability mismatch; configuring, using mediation interworking rules and information about the first TBE and the second TBE, a mediation interworking element (MIWE) for mediating the at least one performance or capability mismatch; and performing, during a test session involving the test environment and using the MIWE, at least one mediation action, wherein performing the at least one mediation action includes receiving at least one ingress packet stream of packets from the first TBE and/or the second TBE, performing the at least one mediation action using the ingress packet stream of packets, and providing at least one egress packet stream of packets associated with the at least one mediation action.

According to one system, the system includes a test system implemented using at least one processor. The test system is configured for: configuring a first TBE and a second TBE for performing one or more functions in a test environment, wherein the first TBE and the second TBE have different fidelities and at least one performance or capability mismatch; configuring, using mediation interworking rules and information about the first TBE and the second TBE, a MIWE for mediating the at least one performance or capability mismatch; and performing, during a test session involving the test environment and using the MIWE, at least one mediation action, wherein performing the at least one mediation action includes receiving at least one ingress packet stream of packets from the first TBE and/or the second TBE, performing the at least one mediation action using the ingress packet stream of packets, and providing at least one egress packet stream of packets associated with the at least one mediation action.

The subject matter described herein may be implemented in software in combination with hardware and/or firmware. For example, the subject matter described herein may be implemented in software executed by a processor (e.g., a hardware-based or physical processor). In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, such as field programmable gate arrays (FPGAs), and application specific integrated circuits (ASICs). In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 4 is a diagram illustrating example MIWE selection information; and

DETAILED DESCRIPTION

Figure 1:
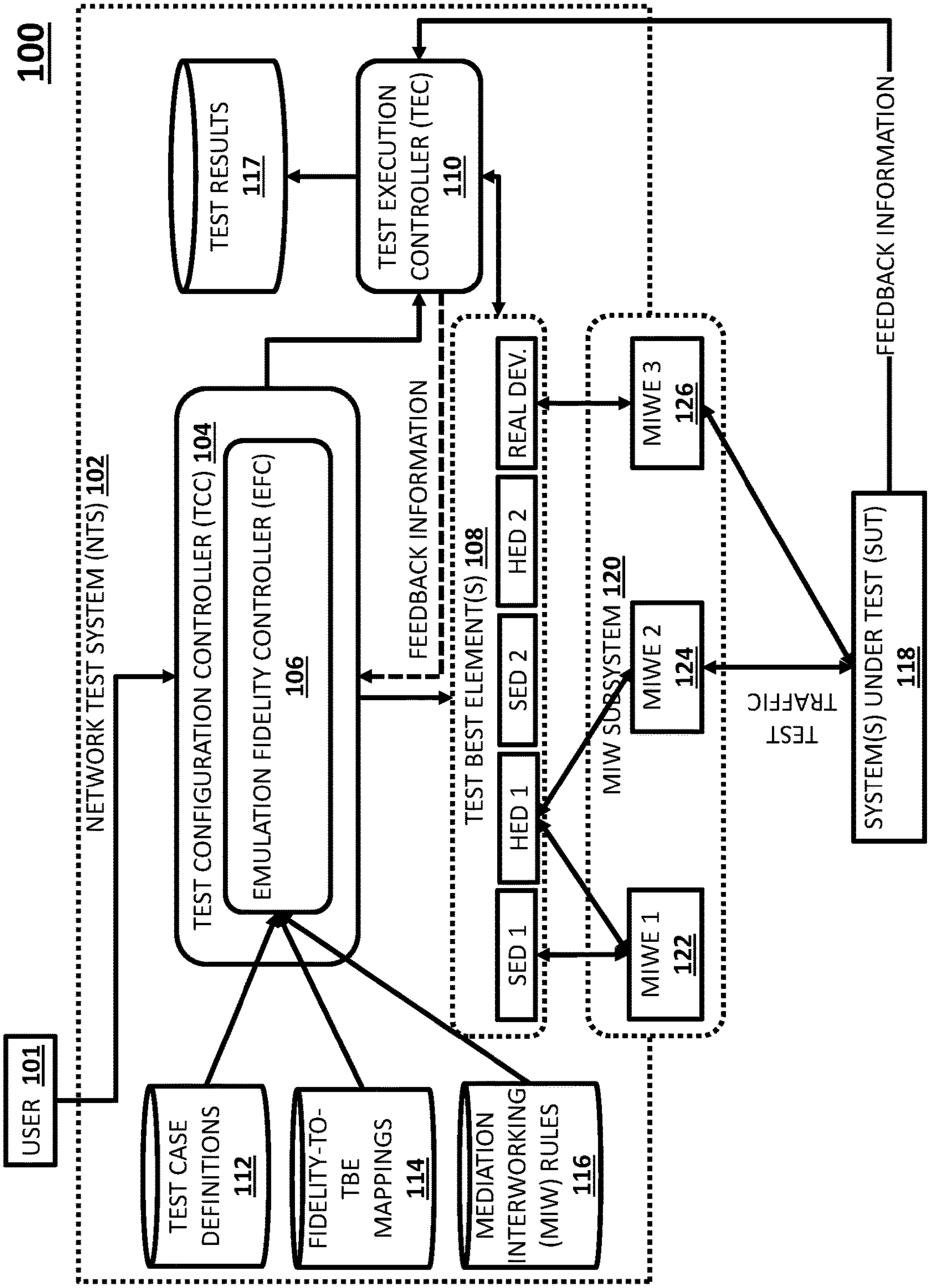
FIG. 1 is a diagram illustrating an example network test environment with mismatch mediation functionality.

The subject matter described herein relates to methods, systems, and computer readable media network for providing a network test environment with mismatch mediation functionality. When testing networks or other system(s) under test (SUT), it may be desirable to test equipment using different test environments or infrastructures, e.g., test bed elements (TBEs) with different emulation fidelity levels (e.g., higher fidelity elements have the ability to accurately represent or emulate a real or non-emulated device). However, testing using different test environments or TBEs with different emulation fidelities can be difficult, time consuming, expensive, and/or inefficient, especially when test operators must manually configure mediation functions or processes to allow TBEs with performance or capabilities mismatches to effectively interact or communicate.

In accordance with some aspects of the subject matter described herein, methods, systems, processes, or mechanisms for providing a network test environment with mismatch mediation functionality are disclosed. For example, a mediation interworking element (MIWE) subsystem in a test system in accordance with some aspects of the subject matter described herein may be configured for accommodating performance and/or capability mismatches amongst different TBEs (e.g., hardware-based device emulators, software-based device emulators, and real devices) configured and deployed in a test environment for a particular test session or scenario. In some embodiments, a MIW subsystem may provide functionality that effectively harmonizes or mediates performance among TBEs with dissimilar capabilities and/or requirements, e.g., by mitigating issues associated with those mismatches or differences. For example, a MIW subsystem may support multiple MIWEs (e.g., software or virtual agents executing on a processor or hardware-based agents or devices) that perform various actions for accommodating or mediating mismatches and/or mitigating issues associated with mismatches. Example TBE related capabilities or requirements that a MIW subsystem or MIWE thereof may adjust or accommodate include, but are not limited to, packet throughput, link bandwidth, one-way latency, round-trip latency, cross-device latency, queue depth, memory size, processor speed, ingress/egress packet rate, etc.

In accordance with some aspects of the subject matter described herein, a test system or a related entity may provide a network test environment with mismatch mediation functionality. For example, a test system in accordance with some aspects of the subject matter described herein may be configured for receiving test configuration information associated with a test session for configuring a test environment comprising a plurality of TBEs; configuring, using the test configuration information and available test system resources, the plurality of TBEs, wherein configuring the plurality of TBEs includes selecting a first TBE of the plurality of TBEs providing a higher fidelity than a second TBE of the plurality of TBEs; initiating the test session involving the test environment; and obtaining test results associated with the test session.

In accordance with some aspects of the subject matter described herein, a test system or a related entity may generate or collect data (e.g., network performance data, test results, feedback, etc.) usable for tuning MIWEs or related aspects. In some embodiments, a MIWE tuner may be closed-loop and include adaptive or other tuning logic (e.g., one or more procedure-based algorithms or artificial intelligence and/or machine learning (AI/ML) models) for analyzing MIWE(s) performance or associated effects (e.g., network bandwidth, latency, packet drops, etc.) and, using the analysis to optimize or improve the MIWE(s), e.g., by adjusting configuration settings and/or operational parameters of MIWE(s) or algorithms thereof.

By providing a network test environment with mismatch mediation functionality, an example network test system can perform network testing involving a SUT or a device under test (DUT) that may not have been possible using previous test systems or that may have been very time consuming, expensive, and potentially prone to human-error (e.g., because of manual configuration of TBEs and mediation functions). Further, by providing a network test environment with mismatch mediation functionality, an example network test system or a related entity can execute test sessions using a network test environment comprising various TBEs having different fidelities or capabilities while mitigating or mediating potential communications or interaction issues.

Reference will now be made in detail to example embodiments of the subject matter described herein, examples of which are illustrated in the accompanying drawings. Wherever possible, the same reference numbers will be used throughout the drawings to refer to the same or like parts.

FIG. 1 is a diagram illustrating a network test environment 100 with mismatch mediation functionality. Test environment 100 may include one or more networks, nodes, and/or devices (e.g., a network test system (NTS) 102) for testing one or more system(s) under testing (SUT) 118. NTS 102 may represent any suitable entity or entities (e.g., one or more testing platforms, nodes, or devices) associated with monitoring and/or testing SUT 118 and may include functionality for selecting and configuring TBEs 108, e.g., software-based emulated devices (SEDs), hardware-based emulated devices (HEDs), or real or non-emulated devices. For example, NTS 102 or a related entity may select a particular TBE 108 based on an emulation fidelity provided by TBE 108 and needed for testing. In this example, NTS 102 or a related entity may select an SED for testing when a low emulation fidelity is needed, select an HED for testing when a moderate emulation fidelity is needed, and select a real device for testing when a high emulation fidelity is needed.

In some embodiments, NTS 102 may include a stand-alone tool, a testing device, a network equipment test device or platform, or software executing on one or more processor(s). In some embodiments, NTS 102 may be a single device or node or may be distributed across multiple devices or nodes, e.g., a cloud based test system. In some embodiments, NTS 102 may include one or more modules for performing various test related functions. For example, NTS 102 may include functionality for emulating TBEs 108 or other nodes or entities and may communicate with SUT 118 or other entities using various internal and/or external communications interfaces. In some embodiments, NTS 102 may include one or more modules or software for performing various mediation interworking elements (MIWEs) or instances thereof. For example, NTS 102 may include MIWEs or instances thereof to allow TBEs 108 of various fidelities (e.g., accuracies and/or capabilities) to communicate effectively, such as by reducing the number of packets from one TBE 108 (e.g., HED 1) if a destined TBE 108 (e.g., SED 1) cannot handle the original number of packets or by increasing the number of packets from one TBE 108 (e.g., SED 1) if a destined TBE 108 (e.g., HED 1) can handle significantly more than the original number of packets.

NTS 102 may include or interact with a user 101, a test configuration controller (TCC) 104, an emulation fidelity controller (EFC) 106, a test execution controller (TEC) 110, TBE(s) 108, a mediation interworking element (MIWE) subsystem 120 for supporting multiple MIWEs, such as MIWEs 122-126, and various data stores comprising test related information, such as test case definitions 112, fidelity-to-TBE mappings 114, mediation interworking (MIW) rules 116, and test results 117.

User 101 may represent a human or another entity (e.g., a management system) that interacts with NTS 102 or related entities. For example, user 101 may interact with one or more of user interfaces (UIs) or graphical user interfaces (GUIs) for selecting test content (e.g., test sessions, test templates, test case definitions, etc.), configuring test sessions or TBE(s) 108, reviewing or analyzing test results or performance metrics, and/or interacting with other test related entities.

TCC 104 may include any suitable entity or entities (e.g., software executing on a processor, a field-programmable gateway array (FPGA), an application-specific integrated circuits (ASIC), or a combination of software, an ASIC, or an FPGA) for performing configuration functions or related aspects. For example, TCC 104 may provide one or more UIs for allowing user 101 to provide configuration information for a test scenario and/or interact with NTS 102 or related entities. In some embodiments, TCC 104 may allow user 101 to browse, add, modify, remove, or select data from one or more data stores (e.g., test case definitions 112, fidelity-to-TBE mappings 114, or MIW rules 116) via a GUI or other UI. In such embodiments, test related data may be selected for configuring test environment 100, TBE(s) 108, and/or other test related entities. For example, via TCC 104, user 101 can select a test case definition indicating a test scenario or objective, a test bed, or a set of TBEs 108 for a test session (e.g., based on a user-provided test objective and mappings 114), can provide additional configuration information needed for setting up each TBE 108 associated with the test session, can provide various other settings or configurations associated with executing the test session, and/or can provide or display test related information about the test session to user 101.

In some embodiments, TCC 104 may support automation e.g., via one or more programming languages (e.g., python), a representation state transfer (REST) application programming interface (API), a remote procedure call API (e.g., gRPC API), a command line interface (CLI), a machine-to-machine (M2M) automation interface, and/or a web based GUI.

EFC 106 may be any suitable entity or entities (e.g., software executing on one or more compute resources) for performing one or more aspects associated with selecting or determining appropriate TBE(s) 108 for a test session using test objectives, areas of interest, emulation fidelity attributes (e.g., data or metrics that are indicative of a fidelity level), or other information. For example, assuming a test objective is related to monitoring particular data paths or certain traffic traversing a test bed, EFC 106 may select and configure high(er) fidelity TBEs 108 (e.g., HEDs or real network switch devices) in the test bed for obtaining metrics or data related to these paths or traffic, while utilizing low(er) fidelity TBEs 108 (e.g., SEDs) elsewhere in the test bed. In another example, assuming a test objective is related to monitoring QoS attributes of traffic shaping data plane traffic, EFC 106 may select and configure high(er) fidelity TBEs 108 (e.g., HEDs or real network switch devices) in the test bed for obtaining detailed QoS metrics or data related to the traffic shaping of the data plane traffic, while utilizing low(er) fidelity TBEs 108 (e.g., SEDs) elsewhere in the test bed.

In some embodiments, EFC 106, TCC 104, or another entity may utilize economic goals or objectives when determining a test plan or related test system resources, e.g., TBEs 108 and related mediators. For example, TCC 104 may provide test objectives, along with economic or environment constraints or objectives, e.g., time constraints (like test runtime is 8 hours or less), physical hardware availability, a total budget amount, a VM instance budget for cloud resources, etc. In this example, EFC 106 may use this information to identify test system resources or TBEs 108 for one or more potential test environments that meet the provided requirements. Continuing with this example, TCC 104 or another entity may use this information to select a test environment configuration to use or may provide the potential setups to user 101 for input. In some embodiments, after a test environment configuration is selected or determined, TCC 104 or another entity may provide configuration information to configure the test environment and/or various information to user 101, e.g., instructions to user related to setting up the test environment and/or projected costs.

TBEs 108 represents test environment elements or underlying resources that can be utilized and deployed for testing. For example, TBEs 108 may be set up and configured using available test system resources including compute resources (e.g., servers, processors, FPGAs, ASICs, etc.) that can execute virtual or emulated devices, such as HEDs and SEDs. In another example, TBEs 108 may be non-emulated devices that can be configured or deployed for various purposes.

In some embodiments, TBEs 108 may be software emulations (e.g., SEDs), hardware emulations (e.g., HEDs), or real devices (e.g., non-emulated, physical devices). For example, a SED or software emulation of a TBE may be an emulation intended to mimic the behavior of a physical or non-emulated device and may be implemented primarily using software running on a general-purpose processor, such as a CPU/CPU-like processor; a HED or a hardware emulation of a TBE may be an emulation intended to the behavior of a physical or non-emulated device and may be implemented primarily using firmware or software running on an ASIC, a programmable ASIC, or an FPGA processor; and a real device may be a production or development version of a physical or non-emulated device.

In some embodiments, SEDs or software emulations may be implemented using general purpose computing platforms, such as CPU-based servers, systems-on-chip (SoCs), data-processing units (DPUs), infrastructure processing units (IPUs), virtual machines or containers, or cloud-based platforms. SEDs or software emulations and may be the most cost effective relative to HEDs or real devices, may also provide lower fidelity than HEDs and real devices. In some embodiments, SEDs or software emulations may be easily scaled to enable software-based simulations of test environments comprising large numbers of TBEs 108 in a highly cost-effective manner. In some embodiments, SEDs or software emulations may typically be utilized in scenarios where mimicry of an application or software aspect of a real device is a test objective or impacts a test objective.

In some embodiments, HEDs or hardware emulations may be implemented using purpose-built and/or customizable processing platforms, such as ASIC or programmable ASIC processing platforms and/or FPGA processing platforms. HEDs or hardware emulations may be more cost effective than real devices but less cost effective than SEDs or software emulations. HEDs or hardware emulations may also provide lower fidelity than real devices but higher fidelity than SEDs or software emulations. In some embodiments, HEDs or hardware emulations may be more difficult to scale than SEDs or software emulations. In some embodiments, HEDs or hardware emulations may typically be utilized in scenarios where mimicry of the software and the underlying hardware behavior of a real device is a test objective or impacts a test objective.

Real devices may include production or development versions of physical or non-emulated devices or elements. Real devices may generally provide higher fidelity than emulations including HEDs and SEDs. While this type of TBE 108 generally provides the highest of fidelity, this type of TBE 108 is typically the least cost effective and, as such, it can be cost prohibitive to deploy such devices at scale, especially in a large or complex test environment.

In some embodiments, EFC selection logic (e.g., executed by NTS 102 or EFC 106) may be affected by prior selected TBEs 108 or their related behaviors or capabilities. For example, when setting up a test environment comprising TBEs 108 with different levels of fidelity, issues can arise when connecting different types or emulation tiers, e.g., a software emulation of a network switch may be incapable of receiving or processing traffic at the same speed as a real network switch or a hardware emulated version. In this example, EFC selection logic (e.g., executed by NTS 102 or EFC 106) may automatically select and implement TBEs 108 with differing levels of fidelity that do not cause issues that would prevent a test objective from being achieved, e.g., TBEs 108 may be selected to match speeds and handling capacity of another side or end of a link or connection.

In some embodiments, EFC 106 or another entity may interact with MIW subsystem 120 for generating, configuring, deploying, or managing MIWEs 122-126. MIW subsystem 120 may include any suitable entity (e.g., a hardware device comprising network interfaces or ports) for providing functionality for mediating or harmonizing performance among TBEs 108 with dissimilar capabilities and/or requirements, e.g., by mitigating or avoiding issues associated with those mismatches or differences.

In some embodiments, MIW subsystem 120 or a related controller may manage a large number of MIWEs, especially when a test environment is complex or has a significant number of TBEs with varying fidelities or capabilities. For example, MIW subsystem 120 may support MIWEs 122-126 (e.g., software or virtual agents executing on a processor of MIW subsystem 120 or hardware-based agents or devices) in a test environment comprising SEDs, HEDs, and real devices as TBEs. In this example, each of MIWEs 122-126 may perform various actions for accommodating or mediating mismatches and/or mitigating issues associated with mismatches. Example TBE related capabilities or requirements that a MIW subsystem or MIWE thereof may adjust or accommodate include, but are not limited to, packet throughput, link bandwidth, one-way latency, round-trip latency, cross-device latency, queue depth, memory size, processor speed, ingress/egress packet rate, port-radix, etc.

In some embodiments, EFC 106 may also perform one or more aspects associated with selecting and deploying appropriate mediators (e.g., MIWEs 122-126) for a test session. For example, concurrently with or after identifying and/or deploying TBEs 108 with different fidelities (e.g., performance mismatches), EFC 106 may use MIW rules 116 in deploying or invoking MIWEs 122-126 for mediating communications or interactions involving one or more of TBEs 108.

In some embodiments, one or more of MIWEs 122-126 may be implemented using hardware and/or software associated with one or more physical devices or platforms. For example, MIWEs 122-126 may be implemented in a programmable switching ASIC (e.g., using P4 or network programming language (NPL)); a data processing unit (DPU) or intelligent processing unit (IPU) (e.g. using P4 and/or ARM code and accelerator cores); or pure software (e.g., kernel drivers, userspace programs, DPDK, eBPF).

In some embodiments, each of MIWEs 122-126 may include ingress and egress interfaces (e.g., physical or virtual interfaces or ports) for interconnecting TBEs 108 (or TBE 108 and another entity). For example, each of MIWE 122 may provide mediated performance mismatch interworking between a lower-fidelity TBE (e.g., SED 1) and a higher-fidelity TBE (e.g., HED 1) during the execution of a test within a testbed environment.

In some embodiments, e.g., as depicted in FIG. 1, MIWE 122 may mediate communications between SED 1 and HED 1; MIWE 124 may mediate communications between HED 1 and SUT 118; and MIWE 126 may mediate communications between a real device and SUT 118. In this example, each of MIWE 122-126 may include separate or independent functions or algorithms for different traffic types, traffic directions, or packet flows, e.g., an amplification algorithm for increasing packets of an ingress packet stream from SED 1 destined for HED 1 and a reduction algorithm for decreasing packets of an ingress packet stream from HED 1 destined for SED 1.

In some embodiments, each of MIWEs 122-126 may be configured for receiving an ingress packet stream generated by a first TBE 108 (e.g., an emulation resource, a SUT resource, etc.) processing the packet stream using a predetermined performance mismatch mediation function (e.g., an algorithm or software executing on one or more processors) to yield or generate a post-processed packet stream, where the post-processed packet stream may be forwarded to a second TBE 108 or another test related entity.

In some embodiments, one or more of MIWEs 122-123 may be capable of mixing or multiplexing multiple ingress packet streams (and/or other processing) before sending a resulting output packet stream to another TBE 108 or other test related entity, e.g., SUT 118. For example, MIWE 124 may receive two ingress packet streams destined for SUT 118 from two different TBEs (e.g., SED 1 and SED 2). In this example, MIWE 124 or a mediation function thereof may perform performance mismatch mediation processing (e.g., generating additional packets, down-sampling packets, modifying packet headers so that sequence numbers are reordered, etc.) on the two ingress packet streams, and may subsequently multiplex the two processed ingress packet streams into a single, output packet stream that is forwarded to SUT 118.

In some embodiments, mediation functions (e.g., algorithms, software, or logic) executed in or by one or more of MIWEs 122-126 may be selected and applied to an ingress packet stream for mitigating or mediating, at least in part, performance mismatches (e.g., differences in packet processing rates, link bandwidth, transactions per second, etc.) that exist between a sending TBE 108 (e.g., SED 1) and a receiving TBE 108 (e.g., HED 1). Example performance mismatch mediation functions may include, but are not limited to, functions that decrease the size (e.g., number of packets) and/or rate of an ingress packet stream (e.g., by dropping packets from the packet stream), functions that increase the size and/or rate of an ingress packet stream (e.g., by generating additional packets and inserting them in the output packet stream), functions that decrease or increase payload or header size of packets in an ingress packet stream, or functions that modify packet parameters or other characteristics.

In some embodiments, mediation functions for decreasing the size of an ingress packet stream may utilize various techniques, including but not limited to, down-sampling of an ingress packet stream to produce a smaller egress packet stream. In such embodiments, down-sampling may be performed, for example, using a random or pseudo-random sampling algorithm, e.g., randomly select on average, one out of every ten ingress packets, etc. Other down-sampling techniques and/or discard ratios may also be used, e.g., subsampling, random sampling, maximum pooling, minimum pooling, etc.

In some embodiments, mediation functions for decreasing the size of an ingress packet stream may utilize packet filtering techniques, such as applying a filtering mask to an ingress packet stream and passing only those packets to a destination that match the applied mask. Other filtering techniques may also be used, e.g., quality of service (QoS) filtering, deep packet inspection, traffic shaping, etc.

In some embodiments, mediation functions for increasing the size of an ingress packet stream may utilize various techniques, including but not limited to, applying a fuzzy packet generation algorithm or an amplification or inflation algorithm to at least some packets of the ingress packet stream. In such embodiments, additional or generated packets may be added or multiplexed into the ingress packet stream, thereby increasing the number of packets that the post-processed output packet stream relative to the received or ingress packet stream.

In some embodiments, mediation functions may also perform packet modifications in some or all of packets of an ingress packet stream. For example, MIWE 122 may alter or manipulate (e.g., edit, remove, add) packet header parameters or packet payload data for some or all packets of an ingress packet stream prior to the packets being sent onward toward a destination via MIWE 122. In another example, MIWE 124 may recalculate and insert an updated cyclic redundancy check (CRC), a checksum or a similar value in a modified packet if necessary. In another example, MIWE 126 may modify packet payloads of ingress packets prior to the packets being sent onward toward a destination via MIWE 126.

In some embodiments, e.g., after selecting appropriate TBE(s) 108 and MIWEs 122-126, TCC 104 and/or EFC 106 may perform various actions associated with orchestrating a test session. For example, orchestrating a test session may involve interpreting, generating, performing configuration actions associated with a test session or a related test case definition. In this example, EFC 106 may generate commands or instructions responsible for configuring or setting up TBEs 108 needed for a particular test session.

TEC 110 may be any suitable entity or entities (e.g., software executing on one or more compute resources) for performing one or more aspects associated with executing or managing a test session and/or collecting test results. For example, executing a test session may involve starting, stopping, or pausing test traffic generation and/or performance monitoring using one or more commands sent to TBE(s) 108, MIWEs 122-126, or other test related entities, e.g., via a management network.

In some embodiments, TEC 110 may be configured to initiate and manage execution of a test session involving TBE(s) 108 and MIWEs 122-126. For example, TEC 110 may communicate with and control TBEs 108 (e.g., emulated switching fabric, traffic generators, network taps, visibility components, switches, etc.) and related MIWEs 122-126 during a test session. In another example, TEC 110 may communicate with and control TBEs 108 to gather and store test results 117, e.g., captured or copied traffic, telemetry data, or performance metrics. In another example, TEC 110 may communicate with one or more visibility tool(s) 118 located in or separate from TBE(s) 108 to obtain feedback information or other data.

SUT 118 may be any suitable entity or entities (e.g., devices, systems, or platforms) for receiving, processing, forwarding, and/or sending one or more messages (e.g., packets). For example, SUT 118 may include a network node, a network switch, a network router, a network interface card, a packet forwarding device, or one or more virtual network functions (VNF). In some embodiments, SUT 118 may be part of the same network, the same data center, or a same switching fabric as NTS 102 or related entities, e.g., TBE(s) 108 or traffic generators.

It will be appreciated that FIG. 1 is for illustrative purposes and that various depicted entities, their locations, and/or their functions described above in relation to FIG. 1 may be changed, altered, added, or removed.

Figure 2:
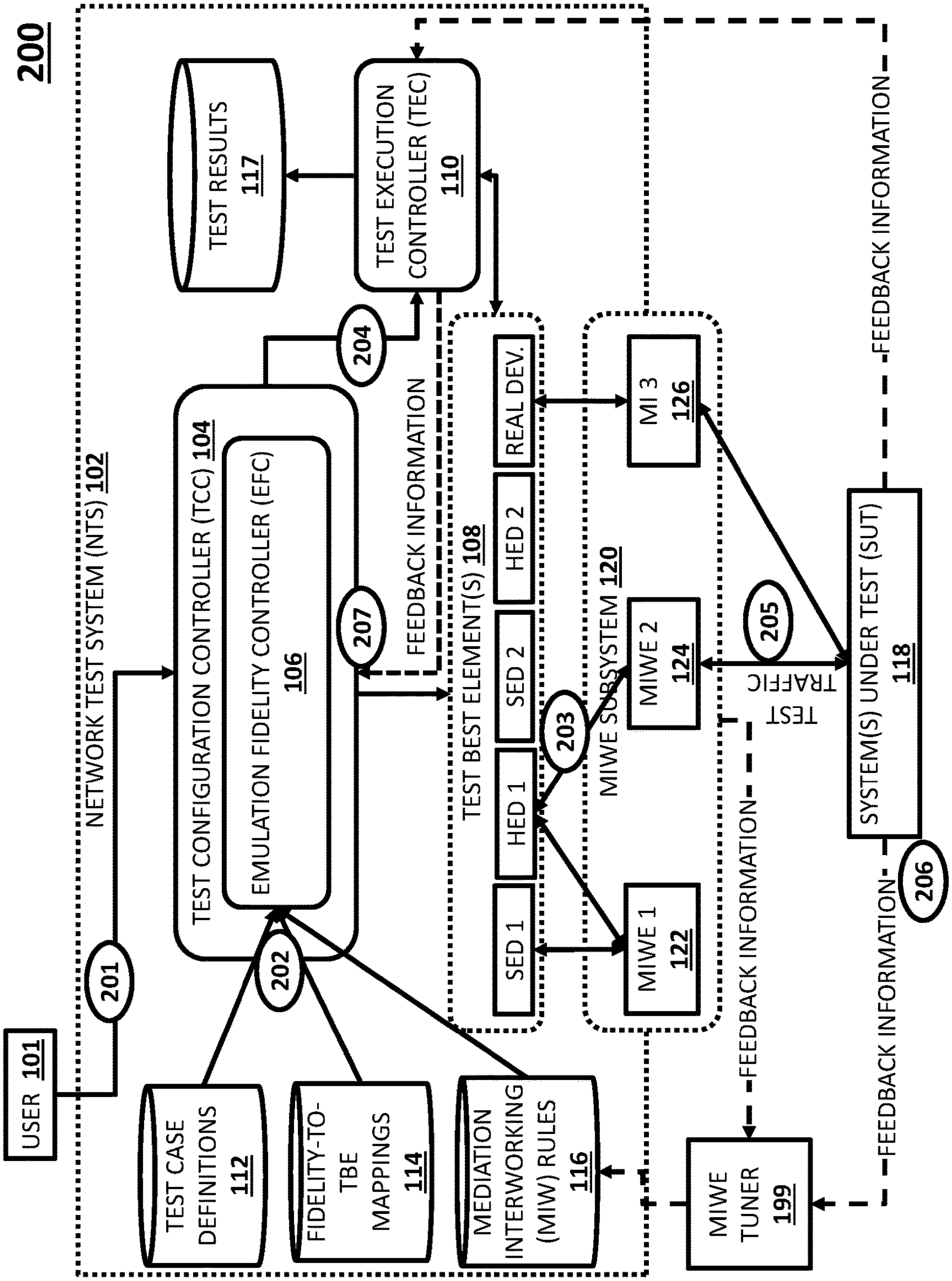
FIG. 2 is a diagram illustrating an example process for utilizing a closed-loop mediation interworking element (MIWE) tuner.

FIG. 2 is a diagram illustrating an example process 200 for setting up a test bed environment including MIWEs 122-126 for facilitating communications involving one or more of TBEs 108. For example, each of MIWEs 122-126 may include algorithms or logic for mediating or mitigating particular performance mismatches, e.g., between particular TBEs 108 or one TBE 108 and another entity. In this example, MIW subsystem 120 may include a hardware device or platform (e.g., a programmable switch or a test device with physical network interfaces) that acts as an intermediary for ingress packet streams and egress packet streams from one or more TBEs 108. Continuing with this example, MIW subsystem 120 or resources thereof can be used in implementing or supporting MIWEs 122-126 or instances thereof for processing or adjusting those packet streams using appropriate algorithms or logic for a subsequent destination.

In some embodiments, such as depicted in FIG. 2, NTS 102 may include or utilize a MIWE tuner 199. MIWE tuner 199 may be any suitable entity or entities (e.g., software executing on a processor, an FPGA, an ASIC, or a combination of software, an ASIC, or an FPGA) for providing goal-seeking or closed-loop tuning algorithm capabilities, For example, MIWE tuner 199 may be configured to find optimal mediation parameters, modes, or algorithms for mediating mismatches or effects thereof associated with one or more TBEs 108.

In some embodiments, MIWE tuner 199 may monitor various aspects (e.g., effectiveness, input, output, etc.) of one or more MIWEs or instances thereof (e.g., MIWEs 122-126) and may obtain associated performance metrics, e.g., from MIW subsystem 120 or other sources. In such embodiments, the performance metrics and/or other obtained data may be used to dynamically adjust configurations and/or operational parameters of MIWEs 122-126 (or related mediation actions) deployed in a test environment, e.g., in effort to optimize mediation interworking (MIW) performance for a given test environment or scenario.

In some embodiments, MIWE tuner 199 may utilize an integrated AI/ML model to predict or recommend mediator configuration and operational parameter adjustment strategies based on feedback data and/or other information. In some embodiments, MIWE tuner 199 or another entity may use test results, feedback information, or other data to generate or supplement training data and then use this training data to generate or update an AI/ML model usable in tuning MIWEs or aspects thereof. Example AI/ML models may include artificial neural network (ANN) models, genetic algorithm models, etc.

Unless otherwise described, elements depicted in FIG. 2 may include similar or the same functionality as those same-numbered elements described above and depicted in FIG. 1.

Referring to process 200, in step 201, user 101 may interact with and provide test configuration information or other data to TCC 104. In some embodiments, user 101 may select or modify a test case (e.g., via a GUI or another interface) from a group of stored test case definitions 112 (e.g., previously saved test case definition files).

In step 202, TCC 104 may utilize EFC 106 or related functionality for configuring and deploying test system resources (e.g., TBEs 108 and MIWEs 122-126) in a test environment (e.g., a test bed). For example, TCC 104 and/or EFC 106 may access user input, related test case definitions 112, mappings 114, and/or MIW rules 116 and may use this information in determining for a given test session what type(s) of emulation are needed or appropriate for TBE(s) 108 and what, if any, MIWEs (e.g., MIWEs 122-126) are needed for MIW purposes.

In step 203, after emulation type determinations, TCC 104 may generate test system resource configuration instructions for configuring TBEs 108, MIWEs 122-126 and other test environment entities and may use these instructions when configuring and/or deploying TBEs 108 and MIWEs 122-126 in the test environment (e.g., a test bed).

In step 204, after test environment configuration, TEC 110 may initiate a test session and related test feedback collection (e.g., by triggering traffic generators, test agents, and/or monitoring agents). In some embodiments, one or more TBEs 108 may include emulated or real traffic generators (e.g., hardware-based packet blasters) and may generate the test packets for a test session. In some embodiments, one or more TBEs 108 may include network nodes or intermediary nodes that receive test packets generated by other test system resources, e.g., traffic generators.

In step 205, testing may occur including sending and receiving test traffic via TBEs 108, MIWEs 122-126, and/or SUT 118. For example, MIWE 122 may mediate communications between SED 1 (e.g., a software-based traffic generator) and HED 1 (e.g., a hardware-based emulated network switch or router); MIWE 124 may mediate communications between HED 1 and SUT 118 (e.g., a data center switch); and MIWE 126 may mediate communications between a real device and SUT 118. In this example, each of MIWE 122-126 may include separate or independent functions or algorithms for different traffic types, traffic directions, or packet flows, e.g., an amplification algorithm for increasing packets of an ingress packet stream from SED 1 destined for HED 1 and a reduction algorithm for decreasing packets of an ingress packet stream from HED 1 destined for SED 1.

In step 206, after or during testing, test feedback information or other data may be collected and/or provided to TEC 110, MIWE tuner 199, or other entities for analysis or reporting. For example, MIWE tuner 199 or another entity may query MIW subsystem or a data store for MIWE performance statistics. In another example, a monitoring agent in SUT 118 may utilize a management network or other method for providing SUT performance metrics, network metrics, and/or copies of test traffic or responses thereto.

In step 207, TEC 110 and/or other test related entities may send feedback information or related data (e.g., emulation fidelity performance data) to one or more entities, such as EFC 106, MIWE tuner 199, and/or a data store, such as test results 117.

In embodiments where NTS 102 or another entity (e.g., EFC 106) utilizes MIWE tuner 199, MIWE tuner 199 or an AI/ML model thereof may use feedback information or related data from testing to suggest changes to configuration settings or operational parameters of one or more of MIWEs 122-126. In such embodiments, NTS 102 or another entity may utilize analysis or data from MIWE tuner 199 to implement such changes or variations thereof prior to executing additional tests.

It will be appreciated that process 200 is for illustrative purposes and that different and/or additional actions may be used. It will also be appreciated that various actions described herein may occur in a different order or sequence.

Figure 3:
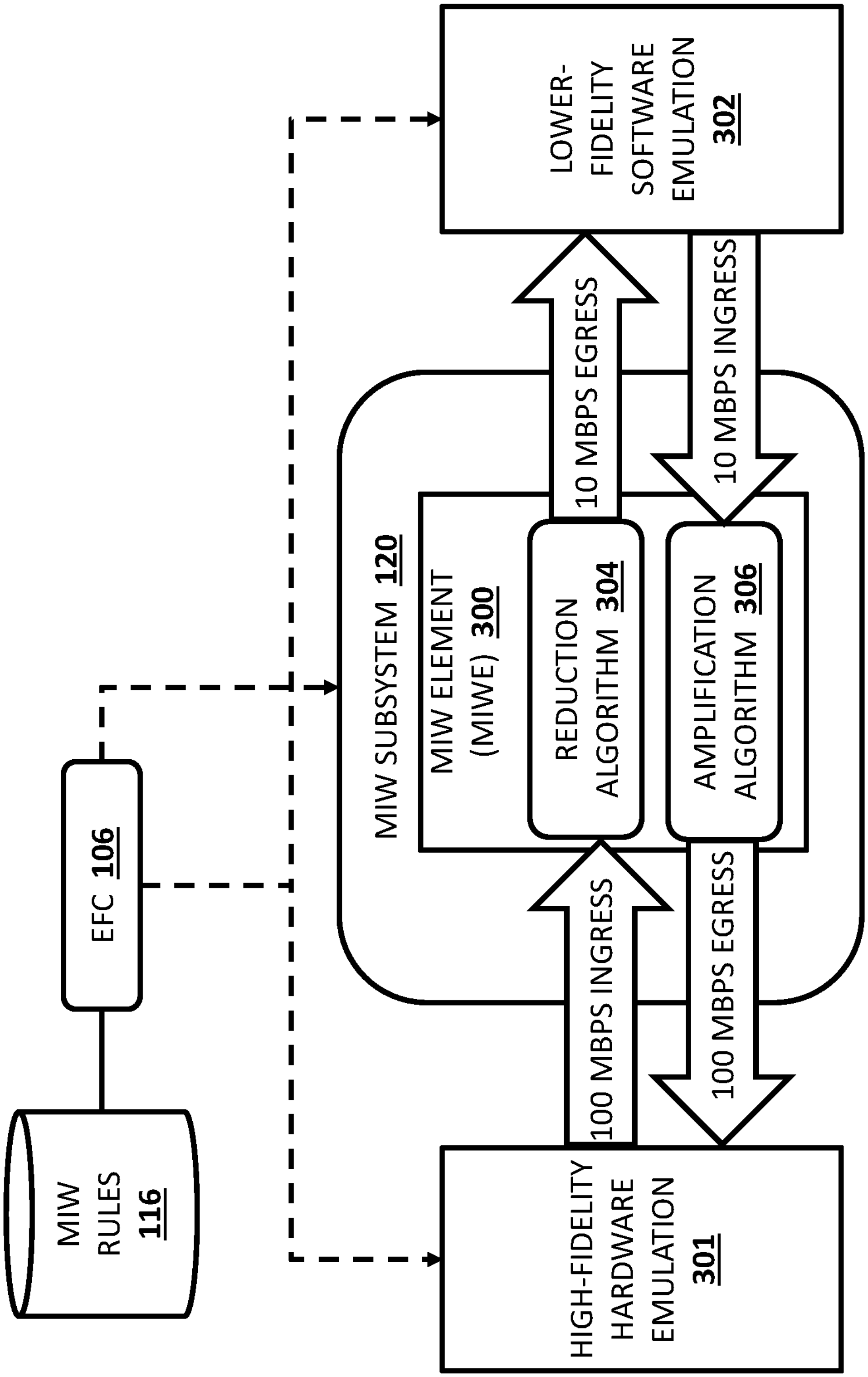
FIG. 3 is a diagram illustrating an example MIWE performing mediation functions.

FIG. 3 is a diagram illustrating an example MIWE 300 performing multiple mediation functions. Referring to FIG. 3, e.g., after selecting and/or deploying TBEs for a test environment, EFC 106 may use MIW rules 116 to select and/or configure MIWE 300 (e.g., via MIW subsystem 120) for facilitating communications between a high-fidelity hardware emulation 301 and a lower-fidelity software emulation 302. For example, high-fidelity hardware emulation 301 may represent one type of TBE 108, such as an emulated firewall, capable of a 100 megabits per seconds (Mbps) throughput and a lower-fidelity software emulation 302 may represent another type of TBE 108, such as an emulated mobile device, capable of a 10 megabits per seconds (Mbps) throughput.

In some embodiments, MIWE 300 may include software or logic executing on a physical platform (e.g., MIW subsystem 120 or another device) with one or more network interface cards (NICs) and/or other hardware. In some embodiments, MIWE 300 may be configured for performing various actions for facilitating communications between emulations having different fidelities (e.g., performance capabilities). For example, actions may be performed by software or algorithms to mitigate or mediate issues associated with performance or other mismatches between two or more TBEs 108, like emulations 301 and 302. In this example, some traffic or packets may be handled differently depending on various factors, such as flow direction, destination, source, etc.

In some embodiments, configuration or related settings of MIWE 300 may be determined, at least in part, using pre-determined performance mismatch interworking rules associated with different emulation resource types. Ingress and egress links to and from MIWE 300 may be facilitated by an internal switching fabric associated with a test environment. In some embodiments, additional or related configuration of MIWE 300, such as the configuration of the switching fabric and associated switching rules, may be performed by or with assistance from TCC 104.

In some embodiments, MIWE 300 may compensate for performance mismatches (e.g., different processing speeds or throughputs) by reducing or increasing the amount and/or the rate of packets being communicated between emulations 301 and 302. For example, as depicted in FIG. 3, high-fidelity hardware emulation 301 may generate a 100 Mbps test packet stream destined for lower-fidelity software emulation 302. In this example, MIWE 300 may receive the 100 Mbps test packet stream from hardware emulation 301 and apply a reduction algorithm (e.g., a down-sampling function) to the packet stream. Continuing with this example, the down-sampled packet stream (now having a rate of 10 Mbps) may be forwarded (e.g., via an internal switching fabric) to software emulation 302.

In an example of the reverse direction, also depicted in FIG. 3, software emulation 302 may generate a 10 Mbps test packet stream destined for hardware emulation 301. In this example, MIWE 300 may receive the 10 Mbps test packet stream from software emulation 302 and apply an amplification algorithm (e.g., an up-sampling function, a packet duplication or packet generation function, etc.) to the packet stream. Continuing with this example, the amplified packet stream (now having a rate of 100 Mbps) may be forwarded (e.g., via an internal switching fabric) to hardware emulation 301.

It will be appreciated that FIG. 3 is for illustrative purposes and that various depicted entities, their locations, and/or their functions described above in relation to FIG. 3 may be changed, altered, added, or removed.

FIG. 4 is a diagram illustrating example MIWE selection information 400 for selecting and/or configuring appropriate MIWE(s) (e.g., MIWEs 122-126) or instance(s) thereof. In some embodiments, information 400 may include any suitable information for determining an appropriate MIWE to use in a network test environment based on TBE information (e.g., capabilities, performance metrics, supported protocols, maximum throughput, minimum throughput, average latency, etc.), user preferences, or other information (e.g., a test objective, a test requirement, etc.). For example, information 400 may include a selection rule identifier (ID), one or more selection criteria (e.g., TBE types, traffic direction, mediation actions needed), and a corresponding MIWE or a related ID for performing one or more mediation actions.

In some embodiments, information 400 or other data may be accessed and/or stored by NTS 102 and/or other entities (e.g., TCC 104, EFC 106, etc.) using one or more data structures or storage devices. For example, an accessible data store, such as MIW rules 116, comprising information 400 or a portion thereof may be accessed by EFC 106 when selecting and configuring TBEs 108 and related MIWEs 122-126 for a test environment.

Referring to FIG. 4, information 400 may be depicted using a table representing various types of data associated with selecting and/or configuring appropriate MIWEs or instances thereof. For example, each table row depicted in FIG. 4 may represent a MIW rule for indicating a particular set of selection criteria and a corresponding MIWE to configure and deploy.

A selection rule ID may include any suitable information for selecting and/or configuring appropriate MIWE(s) (e.g., MIWEs 122-126) or instance(s) thereof. For example, a selection rule ID may be a value (e.g., an alphanumeric value, an integer, or a letter) that uniquely identifies a set of selection criteria and a corresponding priority level. In this example, the selection rule ID may act as a lookup value or as part of a lookup value (e.g., along with a test session identifier and/or a test operator identifier) for determining associated selection criteria and MIWE information.

Selection criteria may include any suitable information for determining a particular MIWE or instance thereof. For example, selection criteria may include logic or data that filters or selects appropriate MIWE(s) using TBE information, user preferences, or other data, e.g., a test objective, a test requirement, metrics tested or used in testing. In this example, NTS 102 and/or another entity (e.g., TCC 104, EFC 106, etc.) may use the selection criteria to determine an appropriate MIWE or instance to perform one or more mediation actions, e.g., packet reduction, packet amplification, etc.

A MIWE ID may include any suitable information for indicating appropriate MIWE(s) or instance(s) thereof. For example, a MIWE ID may include information (e.g., a resource ID, a MIWE image identifier, etc.) indicating one or more MIWE(s) or instance(s) thereof. In some embodiments, a list of appropriate MIWE IDs for a particular set of selection criteria may be prioritized or ordered for selection purposes, e.g., based on resource efficiency, cost, or other sorting criteria.

It will be appreciated that information 400 in FIG. 4 is for illustrative purposes and that different and/or additional information may also be stored or maintained. Further, it will be appreciated that information 400 or related data may be stored in various data structures, memories, or computer readable media and that information 400 or related data may be stored in one or more locations.

Figure 5:
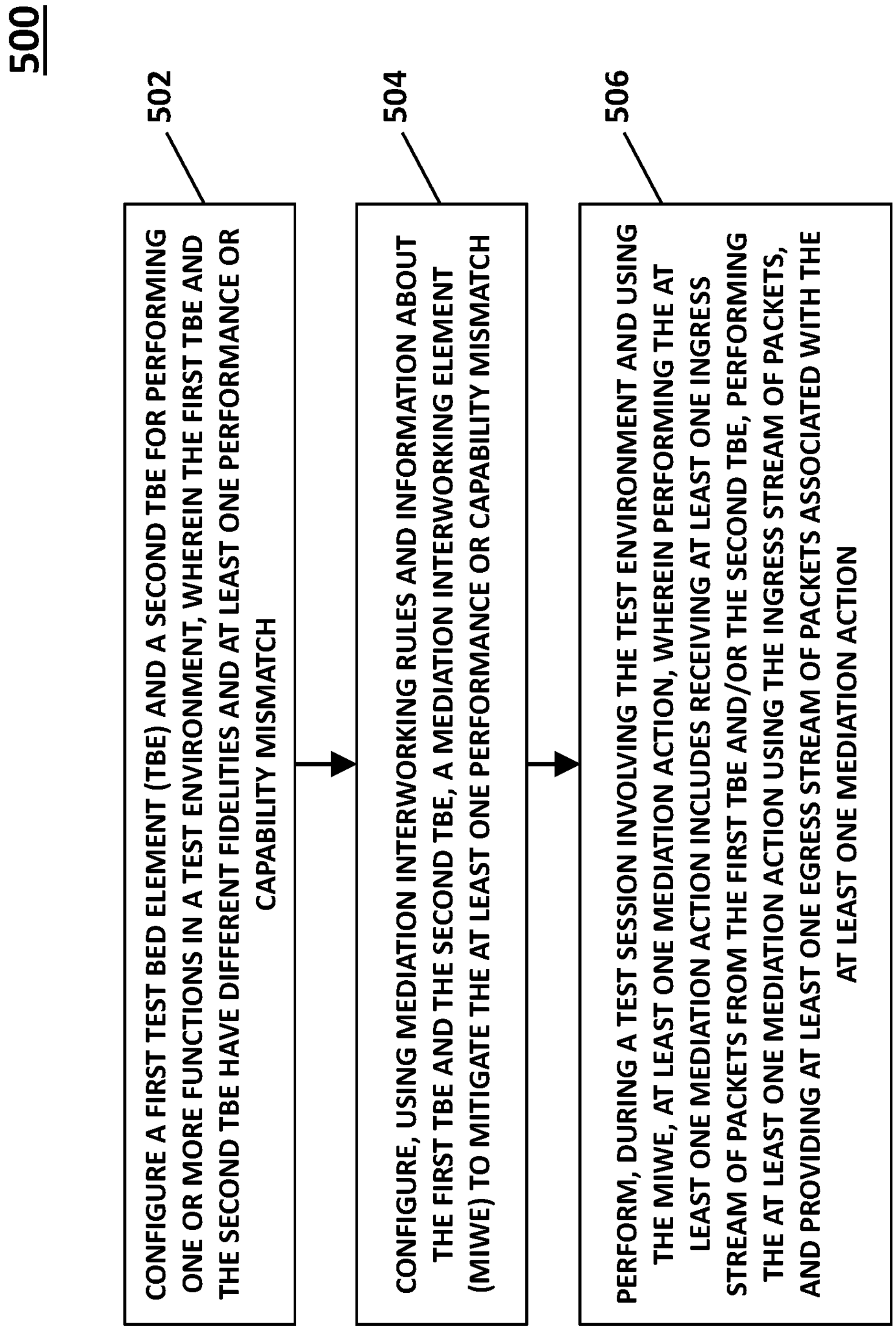
FIG. 5 is a diagram illustrating an example process for providing a network test environment with mismatch mediation functionality.

FIG. 5 is a diagram illustrating an example process 500 for providing a network test environment with mismatch mediation functionality. In some embodiments, process 500, or portions thereof, may be performed by or at NTS 102 (e.g., a test system), TCC 104, EFC 106, TEC 110, and/or another node or module. In some embodiments, process 500 may include steps 502, 504, and/or 506.

Referring to process 500, in step 502, a first TBE (e.g., a high-fidelity hardware emulation 301 or another TBE 108) and a second TBE (e.g., a lower-fidelity software emulation 302 or another TBE 108) may be configured for performing one or more functions in test environment 100 may be configured, where the first TBE and the second TBE have different fidelities and at least one performance or capability mismatch.

In step 504, a MIWE (e.g., MIWE 122) for mediating the at least one performance or capability mismatch may be configured using MIW rules and information about the first TBE and the second TBE.

In step 506, at least one mediation action may be performed during a test session involving the test environment and using the MIWE. In some embodiments, performing at least one mediation action may include receiving at least one ingress packet stream of packets from a first TBE and/or a second TBE, performing the at least one mediation action using the ingress packet stream of packets, and providing at least one egress packet stream of packets associated with the at least one mediation action.

In some embodiments, NTS 102 or another entity (e.g., MIWE tuner 199) may be configured for obtaining test results or other data associated with the test session (e.g., from SUT 118, MIWEs 122-126, monitoring agents, or other test system related entities); analyzing test results associated with the test session; generating feedback information for adjusting the mediation interworking rules used in selecting a MIWE (e.g., MIWE 122, MIWE 124, MIWE 126, etc.) or for adjusting the MIWE (e.g., by changing operational parameters); adjusting the MIW rules or the MIWE, where adjusting the MIW rules or the MIWE may include changing the MIW rules to select a different MIWE or to select a different configuration of the MIWE for mediating (e.g., mitigating) the at least one performance or capability mismatch; initiating a second test session involving the test environment; and obtaining test results associated with the second test session for use in further tuning.

In some embodiments, NTS 102 or another entity (e.g., MIWE tuner 199) may include or utilize an AI/ML model for adjusting configuration settings and/or operational parameters of a MIWE based on feedback information. For example, MIWE tuner 199 may use test results (e.g., from one or more test sessions involving one or more test environments) to train an AI/ML model for determining adjustments to MIWEs (e.g., by changing operational parameters for improving or optimizing mediation actions).

In some embodiments, a MIWE (e.g., MIWE 300, MIWEs 122-126, etc.) or action(s) thereof (e.g., algorithms 304 and 306) may be implemented by NTS 102, a hardware device, a traffic generator, a programmable switching application-specific integrated circuit (ASIC), an ASIC, software, or an emulation platform.

In some embodiments, a MIWE (e.g., MIWE 300, MIWEs 122-126, etc.) may be configured for adjusting packet throughput, link bandwidth, one-way latency, round-trip latency, cross-device latency, queue depth, memory size, processor speed, an ingress packet rate, or an egress packet rate. For example, when two TBEs 108 are sending traffic at different rates or handling packets at different throughputs, MIWE 126 may be capable of modifying either ingress or egress traffic to mitigate or mediate at least some potential issues associated with these TBEs 108 communicating.

In some embodiments, configuring a MIWE (e.g., MIWE 300, MIWEs 122-126, etc.) may include configuring the MIWE to process or ignore a subset of traversing packets based on one or more observable characteristics. For example, MIWE 124 may include a classifier or similar functionality to identify which packets need processing (e.g., modified) by MIWE 124 and/or which packets do not need processing by MIWE 124. In this example, if packets are classified as not needing to be processed by MIWE 124, such packets may bypass MIWE 124 or traverse MIWE 124 at least some processing by MIWE 124.

In some embodiments, a MIWE (e.g., MIWE 300, MIWEs 122-126, etc.) may include packet reduction logic (e.g., reduction algorithm 304, a down-sampling algorithm, etc.) for processing a first ingress packet stream from the first TBE and decreasing the number of packets of a corresponding egress packet stream sent to the second TBE.

In some embodiments, a MIWE (e.g., MIWE 300, MIWEs 122-126, etc.) may include a packet amplification logic (e.g., amplification algorithm 306) for processing a first ingress packet stream from the first TBE and increasing the number of packets of a corresponding egress packet stream sent to the second TBE.

In some embodiments, a first TBE (e.g., selected, configured, and used in a test environment by NTS 102) may be a non-emulated TBE (e.g., a real device) and a second TBE (e.g., available for use by NTS 102 but not currently used in a test environment) may be a hardware-based emulated TBE (e.g., a HED).

In some embodiments, a first TBE (e.g., selected, configured, and used in a test environment by NTS 102) may be a non-emulated TBE (e.g., a real device) and a second TBE (e.g., available for use by NTS 102 but not currently used in a test environment) may be a software-based emulated TBE (e.g., a SED).

In some embodiments, a first TBE (e.g., selected, configured, and used in a test environment) may be a hardware-based emulated TBE (e.g., a HED) and a second TBE (e.g., available for use by NTS 102 but not currently used in a test environment) may be a software-based emulated TBE (e.g., a SED).

In some embodiments, a first TBE (e.g., selected, configured, and used in a test environment by NTS 102) may include an emulated or non-emulated (e.g., actual or real) version of a gateway, a load balancer, a mobile device, an IoT device, a firewall, a network endpoint, an EDA emulator proxy, a zero trust authentication node, a policy enforcement point, a network switch, a router, a smartswitch, a traffic generator, a network element, a server, an application server, a processing offload or accelerator device, a machine learning processor, a data center element, an O-RAN element, a core network element, a 5G core network element, a 6G core network element, a 5G radio access network element, or a 6G radio access network element.

It will be appreciated that process 500 is for illustrative purposes and that different and/or additional actions may be used. It will also be appreciated that various actions described herein may occur in a different order or sequence.

It should be noted that NTS 102 and/or functionality described herein may constitute a special purpose computing device. Further, NTS 102 and/or functionality described herein can improve the technological field of testing networks or other equipment. For example, by using MIWEs to mitigate or mediate various mismatches when TBEs 108 have differing fidelities, an example network test system can perform network testing that may not have been possible previously and can allow for more emulation especially with entities or areas that are not important to the tester.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing a network test environment with mismatch mediation functionality, the method comprising:

at a test system implemented using at least one processor:

configuring a first test bed element (TBE) and a second TBE for performing one or more functions in a test environment, wherein the first TBE and the second TBE have at least one performance or capability mismatch, wherein the at least one performance or capability mismatch includes a difference in packet processing rates between the first TBE and second TBE such that the first TBE is capable of processing packets at a first rate and the second TBE is capable of processing packets at a second rate that is less than the first rate;

configuring, using mediation interworking rules and information about the first TBE and the second TBE, a mediation interworking element (MIWE) for mediating the at least one performance or capability mismatch; and performing, during a test session involving the test environment and using the MIWE, at least one mediation action, wherein performing the at least one mediation action includes receiving at least one ingress packet stream of packets from the first TBE, performing the at least one mediation action using the ingress packet stream of packets, and providing at least one egress packet stream of packets associated with the at least one mediation action, wherein performing that at least one mediation action includes reducing, by the MIWE, a rate of the at least one ingress packet stream to be less than or equal to the second rate and providing that at least one egress packet stream includes providing the at least one egress packet stream to the second TBE.

2. The method of claim 1 comprising:

at the test system:

obtaining test results associated with the test session;

analyzing test results associated with the test session;

generating feedback information for adjusting the mediation interworking rules used in selecting the MIWE or for adjusting the MIWE;

adjusting the mediation interworking rules or the MIWE, wherein adjusting the mediation interworking rules or the MIWE includes changing the mediation interworking rules to select a different MIWE or to select a different configuration of the MIWE for mediating the at least one performance or capability mismatch;

initiating a second test session involving the test environment; and obtaining test results associated with the second test session for use in further tuning.

3. The method of claim 1 wherein the MIWE is implemented by the test system, a hardware device, a traffic generator, a programmable switching application-specific integrated circuit (ASIC), an ASIC, software, or an emulation platform.

4. The method of claim 1 wherein the MIWE is configured for adjusting packet throughput, link bandwidth, one-way latency, round-trip latency, cross-device latency, queue depth, memory size, processor speed, an ingress packet rate, or an egress packet rate.

5. The method of claim 1 wherein configuring the MIWE includes configuring the MIWE to process or ignore a subset of traversing packets based on one or more observable characteristics.

6. The method of claim 1 wherein the MIWE includes a packet amplification function for processing a first ingress packet stream from the first TBE and increasing the number of packets of a corresponding egress packet stream sent to the second TBE.

7. The method of claim 1 wherein the first TBE is a non-emulated TBE and the second TBE is a hardware-based emulated TBE; wherein the first TBE is a non-emulated TBE and the second TBE is a software-based emulated TBE; or wherein the first TBE is a hardware-based emulated TBE and the second TBE is a software-based emulated TBE.

8. The method of claim 1 wherein the first TBE includes an emulated or non-emulated version of a gateway, a load balancer, a mobile device, an internet of things (IoT) device, a firewall, a network endpoint, an electronic design automation (EDA) emulator proxy, a zero trust authentication node, a policy enforcement point, a network switch, a router, a smartswitch, a traffic generator, a network element, a server, an application server, a processing offload or accelerator device, a machine learning processor, a data center element, an open radio access network (O-RAN) element, a core network element, a fifth generation (5G) core network element, a sixth generation (6G) core network element, a 5G radio access network element, or a 6G radio access network element.

9. A system for providing a network test environment with mismatch mediation functionality, the system comprising:

at least one processor;

a test system implemented using the at least one processor, wherein the test system is configured for:

configuring a first test bed element (TBE) and a second TBE for performing one or more functions in a test environment, wherein the first TBE and the second TBE have at least one performance or capability mismatch, wherein the at least one performance or capability mismatch includes a difference in packet processing rates between the first TBE and the second TBE such that the first TBE is capable of processing packets at a first rate and the second TBE is capable of processing packets at a second rate that is less than the first rate;

configuring, using mediation interworking rules and information about the first TBE and the second TBE, a mediation interworking element (MIWE) for mediating the at least one performance or capability mismatch; and performing, during a test session involving the test environment and using the MIWE, at least one mediation action, wherein performing the at least one mediation action includes receiving at least one ingress packet stream of packets from the first TBE and/or the second TBE, performing the at least one mediation action using the ingress packet stream of packets, and providing at least one egress packet stream of packets associated with the at least one mediation action, wherein performing that at least one mediation action includes reducing, by the MIWE, a rate of the at least one ingress packet stream to be less than or equal to the second rate and providing that at least one egress packet stream includes providing the at least one egress packet stream to the second TBE.

10. The system of claim 9 wherein the test system is further configured for:

obtaining test results associated with the test session;

analyzing test results associated with the test session;

generating feedback information for adjusting the mediation interworking rules used in selecting the MIWE or for adjusting the MIWE;

adjusting the mediation interworking rules or the MIWE, wherein adjusting the mediation interworking rules or the MIWE includes changing the mediation interworking rules to select a different MIWE or to select a different configuration of the MIWE for mediating the at least one performance or capability mismatch;

initiating a second test session involving the test environment; and obtaining test results associated with the second test session for use in further tuning.

11. The system of claim 9 wherein the test system includes or utilizes a MIWE tuner or an artificial intelligence (AI) model for adjusting configuration settings and/or operational parameters of the MIWE based on feedback information.

12. The system of claim 9 wherein the MIWE is implemented by the test system, a hardware device, a traffic generator, a programmable switching application-specific integrated circuit (ASIC), an ASIC, software, or an emulation platform.

13. The system of claim 9 wherein the MIWE is configured for adjusting packet throughput, link bandwidth, one-way latency, round-trip latency, cross-device latency, queue depth, memory size, processor speed, an ingress packet rate, or an egress packet rate.

14. The system of claim 9 wherein configuring the MIWE includes configuring the MIWE to process or ignore a subset of traversing packets based on one or more observable characteristics.

15. The system of claim 9 wherein the MIWE includes a packet amplification function for processing a first ingress packet stream from the first TBE and increasing the number of packets of a corresponding egress packet stream sent to the second TBE.

16. The system of claim 9 wherein the first TBE is a non-emulated TBE and the second TBE is a hardware-based emulated TBE; wherein the first TBE is a non-emulated TBE and the second TBE is a software-based emulated TBE; or wherein the first TBE is a hardware-based emulated TBE and the second TBE is a software-based emulated TBE.

17. The system of claim 9 wherein the first TBE includes an emulated or non-emulated version of a gateway, a load balancer, a mobile device, an internet of things (IoT) device, a firewall, a network endpoint, an electronic design automation (EDA) emulator proxy, a zero trust authentication node, a policy enforcement point, a network switch, a router, a smartswitch, a traffic generator, a network element, a server, an application server, a processing offload or accelerator device, a machine learning processor, a data center element, an open radio access network (O-RAN) element, a core network element, a fifth generation (5G) core network element, a sixth generation (6G) core network element, a 5G radio access network element, or a 6G radio access network element.

18. A non-transitory computer readable medium having stored thereon executable instructions embodied in the non-transitory computer readable medium that when executed by at least one processor of a test system cause the test system to perform steps comprising:

configuring a first test bed element (TBE) and a second TBE for performing one or more functions in a test environment, wherein the first TBE and the second TBE have at least one performance or capability mismatch;

configuring, using mediation interworking rules and information about the first TBE and the second TBE, a mediation interworking element (MIWE) for mediating the at least one performance or capability mismatch, wherein the at least one performance or capability mismatch includes a difference in packet processing rates between the first TBE and the second TBE such that the first TBE is capable of processing packets at a first rate and the second TBE is capable of processing packets at a second rate that is less than the first rate; and performing, during a test session involving the test environment and using the MIWE, at least one mediation action, wherein performing the at least one mediation action includes receiving at least one ingress packet stream of packets from the first TBE and/or the second TBE, performing the at least one mediation action using the ingress packet stream of packets, and providing at least one egress packet stream of packets associated with the at least one mediation action, wherein performing that at least one mediation action includes reducing, by the MIWE, a rate of the at least one ingress packet stream to be less than or equal to the second rate and providing that at least one egress packet stream includes providing the at least one egress packet stream to the second TBE.

* * * * *